Aug. 4, 1931.  S. LACHER  1,817,518
FASTENER DEVICE FOR LUGGAGE
Filed Dec. 22, 1928   2 Sheets-Sheet 1
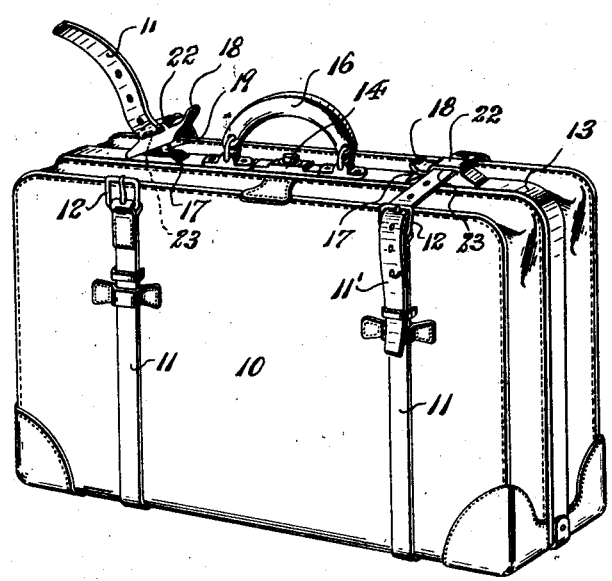
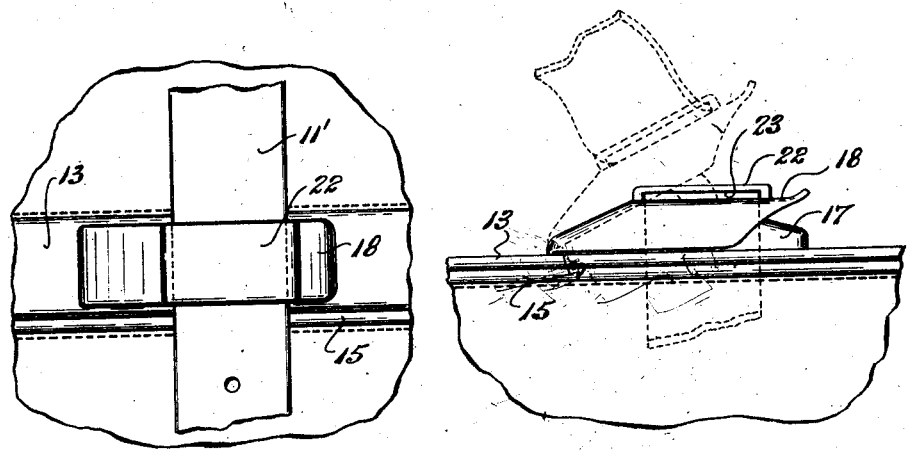
Fig.1
Fig.2
Fig.3
INVENTOR.
Samuel Lacher,
BY George D. Richards
ATTORNEY.

Aug. 4, 1931.  S. LACHER  1,817,518
FASTENER DEVICE FOR LUGGAGE
Filed Dec. 22, 1928   2 Sheets-Sheet 2
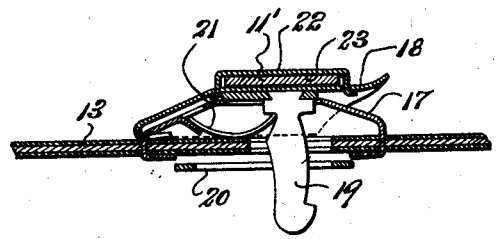
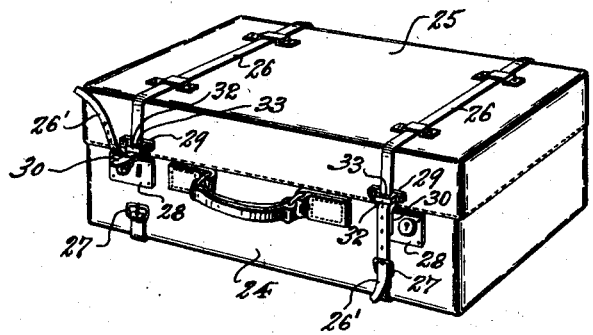
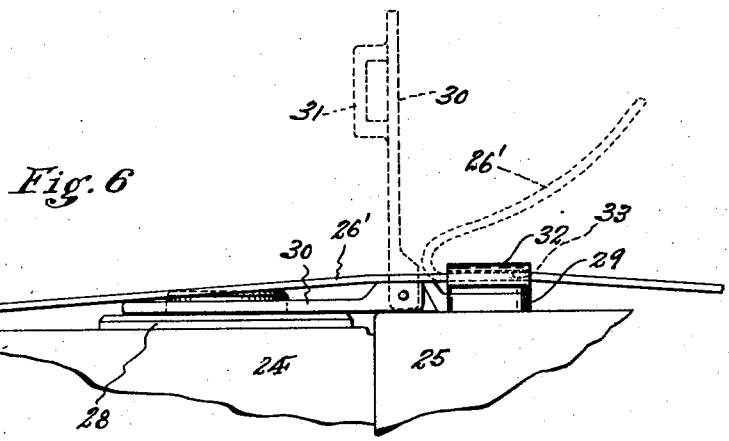
INVENTOR.
Samuel Lacher
BY
George D. Richards
ATTORNEY.

Patented Aug. 4, 1931

1,817,518

UNITED STATES PATENT OFFICE

SAMUEL LACHER, OF NEW YORK, N. Y.

FASTENER DEVICE FOR LUGGAGE

Application filed December 22, 1928. Serial No. 327,852.

This invention relates generally, to improvements in fastener devices for luggage; and the invention has reference, more particularly, to novel fastener devices for traveling bags, suit-cases and similar forms of luggage, having means to cooperate with exterior reenforcing straps with which such luggage is provided, so that said straps protect the manipulative parts of the fastener devices against accidental opening or other displacement and against injury.

The invention has for its principal object to provide fastener devices for luggage having means for engaging and relating an exterior reenforcing strap to the manipulative element of the fastener device, so that, when the manipulative element is moved to operative fastening position, said strap may be disposed and maintained in covering, holding and protecting relation thereto both to securely guard the same against accidental release from its fastened position and to prevent injury thereof by external forces.

The invention, in certain more specific aspects, has for a further object to provide an associated arrangement and relation of fastener device and reenforcing strap, whereby the latter may be utilized to more conveniently and easily manipulate the releasable element of the fastener device as well as for protective function in guarding the latter against accidental release, displacement or injury.

Other objects of this invention, not at this time more particularly enumerated, will be clearly understood from the following detailed description of the same.

Illustrative embodiments of the principles of this invention are shown in the accompanying drawings, in which:—

Figure 1 is a perspective view of a traveling bag of the "Gladstone" type, equipped with a novel arrangement and construction of fastener device coöperative with the frame and with the exterior reenforcing straps thereof; Figure 2 is a fragmentary enlarged plan view of the fastener device; Figure 3 is a side elevation of the same; and Figure 4 is a vertical central longitudinal section through the same.

Figure 5 is a perspective view of a suit-case, having exterior reenforcing straps and fastener devices cooperative with the latter in accordance with the general principles of this invention; and Figure 6 is a fragmentary enlarged side elevation of the fastener device in its cooperative relation to the reenforcing straps of the suit-case.

Similar characters of reference are employed in the above-described views, to indicate corresponding parts.

Referring to Figures 1 to 4 of the drawings, the reference character 10 indicates a traveling bag of the "Gladstone" type, having exterior reenforcing straps 11 provided with buckles 12 with which the free end portions 11' of said straps 11 may be connected and secured in the usual manner. The outer frame section 13 of the bag is provided with the usual center lock means 14 to separably coact with lock tongues (not shown) carried by the inner frame section 15; and said outer frame section 13 is also provided with the usual carrying handle 16.

Mounted on the exterior frame section 13, adjacent to each end of the bag, are side catch bodies 17 with which are pivotally connected the lap portions 18 to which are affixed, so as to depend therefrom, the latch horns 19, which are movable into and out of engagement with the slotted latch plates 20, carried by the inner frame section 15, by lowering and raising said lap portions 18. Spring means 21 are provided to retain the lap portions 18 selectively in either raised catch released position or lowered catch engaged position in the customary manner.

I am not concerned with the specific structure of the side catch members, and therefore do not limit my instant invention to any particular detail construction thereof, which is subject to a wide variation of design, except that in carrying out and applying the principles of my invention some form of manipulatable catch or latch means selectively movable to catch released position and catch engaged position is essential, with which catch or latch means is associated a means for operatively engaging the straps 11 therewith in accordance with the principles of this invention and in order to attain the mode of operation and advantageous functions hereinafter set forth. To this end the lap portions 18 are provided on their upper sides or top parts with loop portions 22 fixedly connected therewith, and arranged to provide an opening or passage 23 through which the free end portion 11' of a reenforcing strap 11 may be threaded, and thus operatively associated with the lap portion 18.

When the bag is closed, and the lap portions 18 of the side catches lowered to catch engaged position, the straps 11 are tightened up around the bag body, and the free end portions thereof engaged with and fastened by the strap buckles 12 (as shown at the right hand end of the bag in Figure 1). With a strap thus fastened, the same traverses the lap portion 18 of a side catch so as to bind down the same in catch engaging position. It will be obvious that, under such arrangement and circumstances, the lap portion 18 is securely held against accidental displacement to open or catch released position, and that the same is guarded against effective application of accidentally applied force tending to move the same to open position. For example, when baggage handlers, porters or others handle bags in service of the traveling public, it frequently happens that bags and other forms of luggage are promiscuously piled one on top of another so that in moving the pieces of luggage with relation to each other in handling, one piece will be dragged over another and will frequently catch the end of a side catch lap portion and will up-raise the same to open or released position, and not infrequently will even break off the same, to the damage of the bag and inconvenience of the owner. Such occurrences are eliminated when the luggage is equipped with the novel arrangement and means above-described for associating the side catch lap portions and reenforcing straps in cooperative relation whereby the strap not only fulfills its desired function of reenforcing the bag body, but also adequately guards and protects the side catch elements both against accidental opening and breakage.

Another advantage of the novel arrangement of cooperatively related reenforcing strap and side catch lap portion above-described is that the free end portion 11' of the strap may (when disengaged from the buckle 12) be utilized to manipulate the lap portion, so that the springs of the side catches may be made stiffer and more forceful than would be practical where finger manipulation thereof is alone depended on. As will be understood from an inspection of the left-hand end of the bag shown in Figure 1, when the strap end portion 11' is released from the buckle 12, it may be grasped by the hand and utilized to manipulate the lap portion 18 of the side catch; pulling upwardly on the strap end operating to swing up the lap portion to catch released position, and pulling downwardly on the strap end operating to swing down the lap portion to catch engaged position.

Referring now to Figures 5 and 6 of the drawings, I have shown a modified form of this invention, wherein the principles thereof are embodied and applied in connection with the hasps of suit-case locks. In these views, the reference character 24 indicates the body of a suit-case and 25 the cover or lid section hinged thereto in the usual manner. The suit-case body is provided with exterior reenforcing straps 26 having buckle fasteners 27 to receive separable engagement of the free end portions 26' of said straps. The suit-case is provided with lock devices near each end, each comprising a lock plate 28 fixed to the body 24 and a manipulatable hasp device carried by the cover or lid section 25 to coact with said lock plate. Said hasp device comprises a fixed base portion 29, attached to the cover or lid section 25, to which is pivotally connected a hasp tongue 30 to overhang the lock-plate and provided with a perforate hasp lug 31 to enter through the lock plate so as to be engaged by the latching and locking mechanism of the latter. Connected with the hasp device, as by fixed attachment to the base portion 29 thereof, or otherwise, is a loop portion 32 arranged to provide an opening or passage 33 through which the free end portion 26' of a reenforcing strap 26 may be threaded, and thus operatively associated with the hasp device.

When the suit-case is closed, and the hasp tongue 30 is brought into latched engagement with the lock plate 28, the straps 26 are tightened up around the suitcase, and the free end portions thereof engaged with and fastened by the buckles 27 (as shown at the right hand end of the suit-case in Figure 5). With a strap thus fastened, the same traverses the hasp-tongue so as to bind down the same in its locked condition. It will be apparent that, under such arrangement and circumstances, the hasp tongue is securely held against accidental displacement from operative latched or closed condition, and guarded from the application of external forces tending to accidentally break open the same. It will therefore be obvious that the principles and advantages of the instant invention are capable of embodiment in connection with various forms of suit-case hasp locks.

While I have illustrated and described my invention with reference to its application to traveling bags and suit-cases, it will be understood that the same is applicable to many other specific forms of luggage, wherein manipulatable catches or similar fastening devices are employed.

Having thus described my invention, I claim:—

1. In an article of luggage having exterior strap and buckle members to embrace the same, a manipulatable fastener means to secure the article in closed condition, said fastener means having a catch portion movable outwardly of said article to release said fastener means, and means provided on said catch portion to pass and retain a portion of said strap in assembled relation to said fastener means catch portion whereby said strap, when secured in buckled condition, traverses, guards, and holds said fastener means catch portion against accidental outward displacement and release from its normal fastened condition.

2. In an article of luggage having exterior strap and buckle members to embrace the same, a fastener means including a hinged manipulatable catch device releasable by turning outwardly from said article, said fastener means serving to secure the article in closed condition, said catch device having a loop portion in fixed connection therewith through which said strap may be passed whereby the latter, when secured in buckled condition, traverses, guards and holds said catch device against accidental outward turning from normal fastening condition.

3. In a traveling bag having a mouth defining frame, external strap and buckle members to embrace the bag body, side catch devices to hold said frame in closed condition, said side catches having hinged manipulatable means to lock and unlock the same, said manipulatable means having openings to receive and pass said straps in assembled relation therewith, whereby said straps, when secured in buckled condition, traverse, guard and hold said manipulatable means against accidental release from catch locking position.

4. In a traveling bag having pivoted frame sections, external strap and buckle members to embrace the bag body, side catch devices mounted on said frame sections, said catch devices including pivoted lap members for manipulating said catch devices, said lap members being turnable outwardly to release said catch devices and having loop portions in fixed connection therewith through which an external strap may be passed whereby the latter, when secured in buckled condition, traverses, guards and holds said lap members against outward displacement from catch actuating position.

In testimony, that I claim the invention set forth above I have hereunto set my hand this 18th day of December, 1928.

SAMUEL LACHER.